United States Patent

Barger et al.

Patent Number: 5,359,902
Date of Patent: Nov. 1, 1994

[54] LOAD CELL

[75] Inventors: James E. Barger, Winchester; Richard Madden, Groton, both of Mass.

[73] Assignee: Bolt Beranek and Newman Inc., Cambridge, Mass.

[21] Appl. No.: 92,127

[22] Filed: Jul. 15, 1993

[51] Int. Cl.$^5$ .................................................. G01L 1/00
[52] U.S. Cl. ............................ 73/862.626; 73/779
[58] Field of Search ............ 73/862.626, 779, 862.627, 73/862.637, 862.642, 862.392

[56] References Cited

U.S. PATENT DOCUMENTS

| | | | |
|---|---|---|---|
| 2,242,011 | 5/1941 | Malmberg | 73/779 |
| 2,484,164 | 10/1949 | Hathaway | 73/779 |
| 2,623,386 | 12/1952 | Baker | 73/862.626 |
| 2,632,149 | 3/1953 | Baker | 73/779 |
| 3,033,032 | 10/1958 | Glerum | 73/862.626 |
| 3,206,971 | 11/1962 | Felix | 73/862.625 |
| 3,241,359 | 3/1966 | Glerum | 73/862.626 |
| 3,302,148 | 1/1967 | Nevius | 336/30 |
| 3,303,447 | 2/1967 | Nevius | 336/30 |
| 3,592,054 | 7/1971 | Stewart et al. | 73/862.627 |
| 3,713,333 | 1/1973 | MacGeorge | 73/862.626 |
| 3,933,034 | 1/1976 | Noel et al. | 73/768 |
| 4,006,628 | 2/1977 | St. Jacques | 73/862.541 |
| 4,083,237 | 4/1978 | Levesque | 73/862 |
| 4,123,735 | 10/1978 | Mash et al. | 336/30 |
| 4,255,975 | 3/1981 | Debreuille | 73/784 |
| 4,384,496 | 5/1983 | Gladwin | 73/862.642 |
| 4,487,079 | 12/1984 | Compton et al. | 73/862.52 |
| 4,627,292 | 12/1986 | Dekrone | 73/728 |
| 4,675,615 | 6/1987 | Bramanti | 330/8 |
| 4,890,084 | 12/1989 | Chu | 336/30 |
| 4,931,730 | 6/1990 | Olsen et al. | 324/209 |
| 4,987,783 | 1/1991 | D'Antonio et al. | 73/432.1 |

*Primary Examiner*—Richard E. Chilcot, Jr.
*Assistant Examiner*—R. Biegel
*Attorney, Agent, or Firm*—Henry D. Pahl, Jr.

[57] ABSTRACT

In the load cell disclosed herein, relative displacement between bridging members or end caps mounted at different points along the axis of an elastic hollow cylinder is sensed by means of a variable reluctance transducer employing a pair of magnetically permeable core elements. One of the core elements is mounted on one of the bridging members and the other core element is C-shaped and mounted on the other bridging member with the ends of the C-shape in close proximity to the first core member thereby providing magnetic gaps whose widths are aligned with the cylinder axis. Windings around the ends of the C-shaped core provide electrical connection for an inductance which is variable as a function of the widths of the gaps and thus also of the axial displacement between the bridging members.

4 Claims, 1 Drawing Sheet

LOAD CELL

BACKGROUND OF THE INVENTION

The present invention relates to a load cell and more particularly to a variable reluctance load cell which is sensitive to relative displacement along a preselected axis but is relatively insensitive to displacements along transverse axes and to bending moments.

It has previously been proposed to use variable reluctance transducers for force measurement. For example, U.S. Pat. No. 3,206,971 to E. Felix discloses the use of a core and winding for sensing changes in proximity to a cantilevered spring. Changes in the inductance caused by changes in the gap between the core and the spring are then reflected in the frequency of an oscillator circuit which employs the inductance as a frequency determining component. Transducers of this type, however, have apparently never enjoyed any great popularity. This is believed to be due to inherent non-linearities in previous designs and due also to sensitivity to forces along axes other than the one intended to be measured. A somewhat analogous field of prior art is that of linear variable differential transformers (LVDTs) which are commonly used for displacement measurement and provide outputs whose amplitudes vary as a function of the measured displacements.

Among the several objects of the present invention may be noted the provision of a load cell utilizing a novel variable reluctance transducer; the provision of such a load cell which responds principally to forces along a preselected axis; the provision of such a load cell which is relatively insensitive to forces along axes transverse to the preselected axis; the provision of such a load cell which is relatively insensitive to bending moments; the provision of such a load cell which provides measurements of high repeatability; the provision of such a load cell which provides measurements of high precision; the provision of such a load cell which is highly reliable and which is of relatively simple and inexpensive construction.

SUMMARY OF THE INVENTION

Briefly, a load cell in accordance with the present invention employs a hollow cylinder constructed of a material providing repeatable elastic properties along the axis of the cylinder. The interior of the cylinder is bridged at different points along its length by appropriate members, e.g., an end cap at each end. Mounted on one of the bridging member is a first magnetic core which extends transversely to the cylinder axis. A magnetically permeable core of generally C-shaped configuration is mounted on the other of the bridging members with the ends of the C-shape each being in close proximity to the first magnetic core thereby to form magnetic gaps whose widths are aligned with the cylinder axis. A winding on one of the cores provides electrical connection for an inductance whose value is variable as a function of the widths of the gaps and thus also to axial distortion of the cylinder.

In accordance with another aspect of the invention, the winding is constituted by two portions, each of which surrounds a respective one of the ends of the C-shaped core closely adjacent the respective gap. This arrangement minimizes non-linearity of response due to fringing effects and extends the operating range of the transducer. Preferably, the portion of the first core facing each of the ends of the C-shaped core is broader in all directions perpendicular to the cylinder axis than the respective end of the C-shaped core thereby to render the inductance value relatively insensitive to displacements in directions perpendicular to the cylinder axis.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
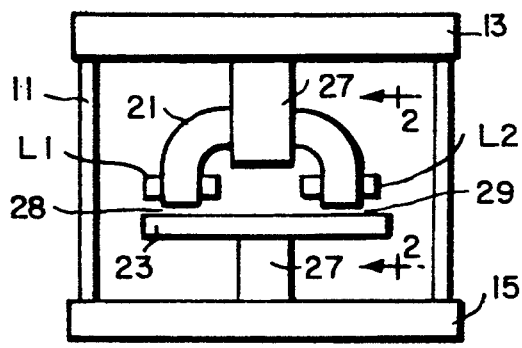
FIG. 1 is a side view, in section, of a load cell in accordance with the present invention.

Referring now to FIG. 1, the load cell illustrated there employs a hollow cylinder 11 of circular cross-section as an elastic element for forces applied in a direction along the cylinder's axis. The cylinder 11 may, for example, be constructed of a high grade steel which has a very repeatable and essentially linear elasticity. The cylinder acts essentially as a lossless spring. While the spring constant will be very high as understood by those skilled in the art, the forces intended to be measured are also quite high. In the embodiment of FIG. 1, the ends of the cylinder 11 are bridged by relatively rigid end caps 13 and 15. While these pieces are shown as being assembled with the cylinder, it should be understood that an integral construction may also be implemented.

Figure 2:
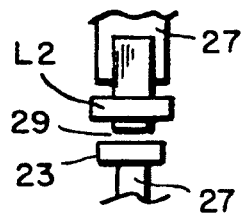
FIG. 2 is an end view of a transducer employed in the load cell of FIG. 1, taken essentially on the line 2—2 of FIG. 1.

A C-shaped magnetic core 21, e.g. constructed of highly permeable laminated transformer material, is mounted on the upper end cap 13 by means of a bracket 27 with the ends of the C-shape pointed down. A I-shaped magnetic core, e.g. also constructed of highly permeable laminated transformer material, is mounted on the bottom cap 15 by means of a bracket 27. The I-core is positioned so that narrow gaps designated by reference characters 28 and 29, exist between each end of the C-core and a facing portion of the I-core. In other words, the widths of the gaps are small as compared with the transverse dimension of the ends of the C-shaped core. Further, the cross-sectional dimensions of the ends of the C-core are smaller than those of the facing portion of the I-core for reasons described in greater detail hereinafter. This may be seen also in FIG. 2.

Mounted around each end of the C-core closely adjacent the respective gap, is a respective pancake winding. The two windings are essentially similar and are designated by reference characters L1 and L2. The windings L1 and L2 are connected in series so that their electromotive forces add. Assuming the width of the gaps, that is, in a direction along the magnetic flux path, is small in relation to the transverse dimensions of the gap region, changes in inductance of the combined element will correspond in a predictable monotonic fashion with changes in the length of the gap. The series connected pair of windings are interconnected in a tuned oscillator circuit, as described hereinafter, so that the combined inductance is a frequency-determining component of the oscillator circuit. As will be understood by those skilled in the art, the cores 21 and 25 are highly permeable and thus the gaps 28 and 29 constitute most of the reluctance in the magnetic circuit linking the windings L1 and L2. Thus, the inductance exhibited will be very directly dependent on the widths of the gaps in the direction of the magnetic circuit, i.e., the vertical direction as shown in FIG. 1.

As an axial load is applied to the load cell of FIG. 1, in the vertical direction as illustrated, the cylinder 11 is compressed and the width of the respective gap between each end of the C-core and the adjacent portion of the I-core will be reduced. As the gaps are reduced, the inductance exhibited increases and the operating frequency of the oscillator in which the inductance is connected will change correspondingly. Typically, this change will be to a lower frequency, assuming the inductor is interconnected in a parallel LC circuit which determines the frequency of oscillation. The frequency of oscillation thus provides a measure of the force applied to the load cell. Preferably, the load cell is calibrated and the correspondence between frequency and load is stored in a computer lookup table. A formula for interpolating between reference points may be used to reduce the number of entries in the table as is understood by those skilled in the art.

Placing the windings L1 and L2 just at the ends of the C-shaped core 21 and closely adjacent the gaps 28 and 29 as illustrated minimizes fringing of the magnetic flux outside the areas of the ends of the C-core facing the I-core. Also, since the facing portion of the I-core opposite each end of the C-core is broader in transverse dimensions than the facing end of the C-core, the inductance value is not sensitive to small displacements of the C-core in directions transverse to the cylinder axis and to the widths of the gaps. Further, since both of the gaps 28 and 29 are effective in determining the value of inductance, small increases in the length of one gap can compensate or offset for small decreases in the length of the other gap. Accordingly, the load cell is relatively insensitive to bending moments applied thereto, i.e. around an axis going into the paper as illustrated in FIG. 1. Bending moments around the other horizontal axis only produce changes in width across the gap but not changes in the average width of each gap, to a first order approximation. While it is significant that one of the magnetically permeable members be C-shaped so that the windings can be placed at the ends of the C-shaped adjacent the gaps, it is not critical that the other permeable member be I-shaped though it is preferred.

Figure 3:
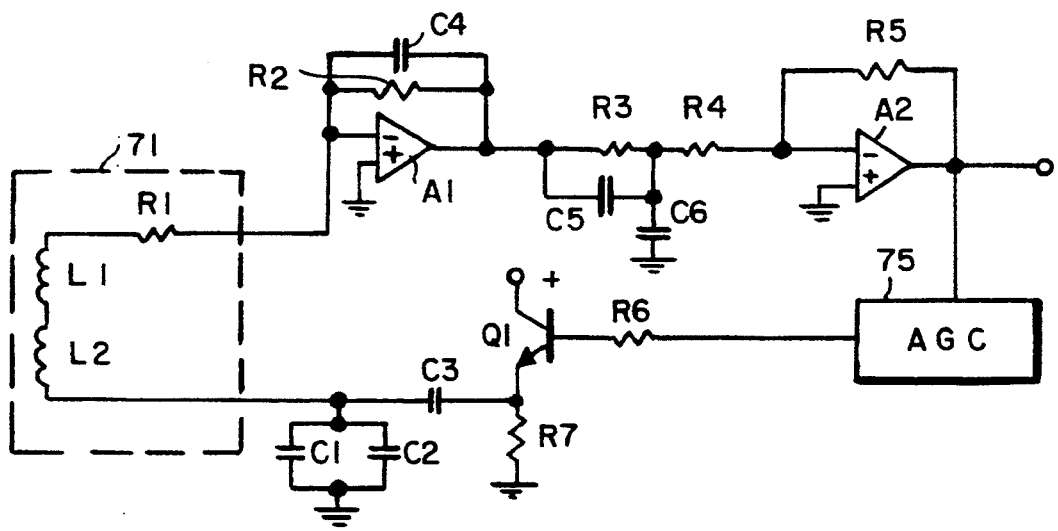
FIG. 3 is a circuit diagram illustrating an oscillator whose operating frequency is controlled by the value of inductance provided by a variable reluctance transducer employed in the load cells of FIGS. 1 and 2.

As indicated previously, the transducer disclosed herein is preferably incorporated in an oscillator circuit so that the inductance of the transducer windings is the principal parameter affecting the oscillator frequency. In particular, the oscillator is designed so that the resistance value of the leads to the windings does not significantly influence the oscillator operating frequency. A particular oscillator circuit exhibiting these desirable characteristics is illustrated in FIG. 3. This oscillator circuit was designed assuming a nominal value of ten millihenrys for the transducer windings and appropriate component types and values are as follows.

| C1 | 1.0 microfarad (poly carbonate) |
|---|---|
| C2 | 1.0 microfarad (poly styrene) |
| C3 | 0.22 microfarad (poly carbonate) |
| C4 | 3300 picofarad |
| C5 | 5600 picofarad |
| R2 | 47 Ohms |
| R3 | 270 Ohms |
| R4 | 220 Ohms |
| R5 | 4700 Ohms |
| R6 | 22 Ohms |
| R7 | 680 Ohms |

Referring now to FIG. 3, a resonant circuit including the transducer winding L1 and L2 is connected across the input of an amplifier A1 which is operated in a negative feedback mode, the amount of feedback being determined essentially by the value of the resistor R2. The resistance of the leads to the windings and of the windings themselves is designated generally by reference character R1. Capacitor C4 is provided to ensure stability.

As is understood by those skilled in the art, the gain of amplifier A1 will be maximized when the input impedance is minimized. This occurs when the impedance of the inductance is equal in magnitude and opposite in phase to the impedance of the capacitance in the resonant circuit. This capacitance is constituted by the capacitors C1, C2 and C3. The capacitor C1 and C2 are connected, on one side, to the inductance and, on the other side, to ground. Preferably, one of the capacitors C1 has a positive temperature coefficient, e.g., is constructed of polycarbonate, while the other capacitor has a negative temperature coefficient, e.g., is constructed of polystyrene. One side of capacitor C3 is also connected to the inductance and the other side is connected to a low impedance driving source, i.e., the transistor Q1 configured as an emitter follower. Capacitor C3 is thus effectively in parallel with the capacitors C1 and C2 in determining the resonant frequency.

Additional gain is provided by an amplifier A2, again operated in a negative feedback mode. The output of amplifier A1 is connected to the inverting input of amplifier A2 through a phase compensation network comprising resistor R3 and capacitors C5 and C6. The output signal from amplifier A2 is coupled to the emitter follower transistor Q1 through an AGC (automatic gain control) circuit 75. The AGC circuit operates to adjust the level of the drive signal applied to the resonant circuit so as to maintain the output level of amplifier A2 at a preselected level, e.g., one volt peak-to-peak. The output signal from amplifier A2 is also provided to an output terminal 76 for utilization by a frequency counter or other means of measuring the frequency of operation of the oscillator. As indicated previously, the characteristics of the transducer itself are highly repeatable so that a calibration table can be set up which correlates output frequency with load.

As indicated previously, the gain of amplifier A1 is maximized when the impedance of the inductance is equal and opposite to that of the capacitance in the resonant circuit and this determines the frequency at which the circuit will oscillate. The frequency of operation is determined essentially entirely by the values of inductance and capacitance and is essentially insensitive to the value of R1 which includes the resistance of any cable to the transducer in the particular embodiment illustrated. Resistance value in a range of from 5 to 200 Ohms have essentially no effect on the frequency of operation. That various changes could be made in this circuit design or that other oscillator designs might also be used will be apparent to those skilled in the art.

While the C-core and the I-core are mounted on end caps in the embodiment shown in FIG. 1, it should be understood that form of mounting is not required but, rather, only that the respective mounting points be established at different points or positions along the length of the cylinder. In other words, a bridging member could be provided at an intermediate point along the length of the resilient cylinder.

Figure 4:
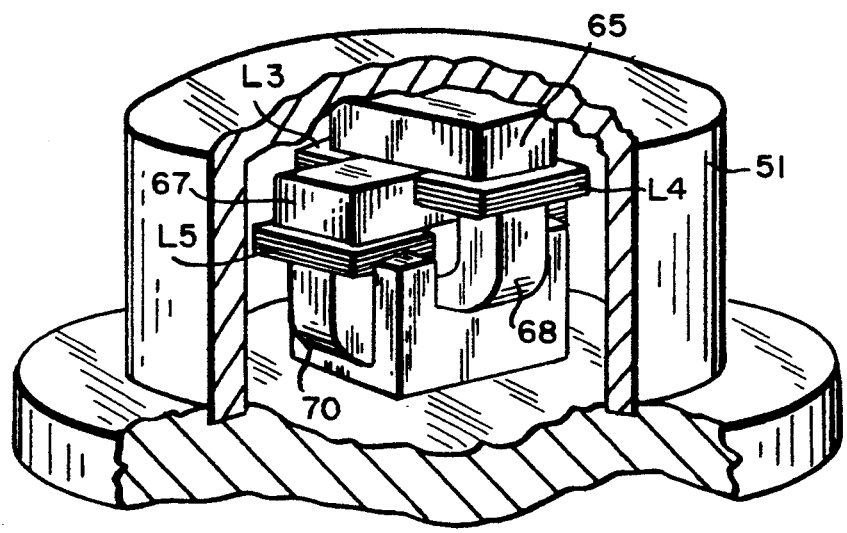
FIG. 4 is an illustration of an alternative embodiment of a load cell in accordance with the invention.

In the embodiment illustrated in FIG. 4, the upper end cap is machined as an integral piece with the cylinder and this integral piece, designated by reference character 51, is mounted on a base plate 63. In this embodiment, redundant magnetic transducer assemblies are incorporated. A first I-shaped core 65 extends in one direction orthogonal to the cylinder axis and beneath it, a second I-core 67 extends at right angles to the first I-core. A first C-core 68 is mounted adjacent the first I-core and the first C-core nests in the open part of a second C-core 70. As in the embodiment of FIG. 1, windings are provided around each end of each C-core adjacent the respective gap as illustrated. These windings are designated by reference characters L3–L6.

As indicated previously, the use of two magnetic transducers is essentially for the purpose of providing reliability through redundancy and it is not contemplated that the windings on one of the C-cores would be in any way interconnected with the windings on the other C-core. They could also be used to provide additional compensation for distortion by forces other than along the axis of the cylinder.

In the embodiment of FIG. 4, the upper cap portion is domed to allow a loading member to essentially self-align with the load cell. One particular use contemplated for load cells of the type disclosed herein is in the measuring of tension loads in the anchoring tendons which link offshore oil drilling rigs to the ocean floor. As is understood, these loads can run into the millions of pounds and the load cell of the present invention is adaptable to such loads while providing high accuracy of measurement together with a high degree of reliability and repeatability of measurement.

In particular, the reliability is enhanced by the fact that the load cell itself contains only passive components thereby reducing the number of failure modes and correspondingly increasing reliability. Similarly, since only two lead wires are required for each transducer, electrical connection is simplified and there is a concomitant increase in reliability. Further, the system is, as noted previously, highly insensitive to changes in lead wire resistance so that longer lead wires between the transducer and the rest of the oscillator circuit do not effect sensitivity or accuracy and no corrections need be applied to the measurements obtained. Also, since there is no contact between the relatively moving parts of the transducer, there can be no binding or sticking which can occur in other types of transducers. Rather, the only connection between the relatively moving parts is the essentially lossless spring, i.e., the cylinder within which they are contained.

In view of the foregoing it may be seen that several objects of the present invention are achieved and other advantageous results have been attained. As various changes could be made in the above constructions without departing from the scope of the invention, it should be understood that all matter contained in the above description or shown in the accompanying drawings shall be interpreted as illustrative and not in a limiting sense.

What is claimed is:

1. A transducer for sensing relative displacement between a pair of parts mounted in spaced relationship along a preselected axis on a member constructed of a material providing a substantially repeatable elastic characteristic along said axis, said transducer comprising:

a first magnetic core extending transversely to said axis and providing a pair of spaced faces which are essentially perpendicular to said axis and mounted on one of said parts;

a magnetically permeable core of generally C-shaped configuration mounted on the other of said parts with the ends of the C-shaped core each being in close proximity to said spaced faces of said first core thereby to form magnetic gaps whose widths are aligned with said axis, the respective face of said first core facing each of said C-shaped core ends being broader in all directions perpendicular to said axis than the respective facing end of said C-shaped core;

respective winding portions on each of said ends of said C-shaped core closely adjacent said magnetic gaps thereby providing connection to an inductance which is variable as a function of the widths of said gaps and thus also as a function of relative displacement of said parts along said axis resulting from strain of said member along said axis.

2. A transducer as set forth in claim 1 wherein the ends of C-shaped core are of equal area and said windings portions are similar thereby to render said inductance substantially insensitive to small angular displacements between said parts.

3. A load cell comprising:

a hollow cylinder constructed of a material providing substantially repeatable elastic characteristic along the axis of the cylinder;

first and second members bridging the interior of said cylinder at different points along the length of the cylinder;

mounted on one of said member, a first magnetic core extending transversely to the cylinder axis and providing a pair of spaced faces which are essentially perpendicular to said axis;

a magnetically permeable core of generally C-shaped configuration mounted on the other of said members with the ends of the C-shape each being in close proximity to said spaced faces of said first core thereby to form magnetic gaps whose widths are aligned with the cylinder axis, the respective face of said first core facing each of said C-shaped core ends being broader in all directions perpendicular to said axis than the respective facing end of the C-shaped core; and respective winding portions on each of said ends of said C-shaped core closely adjacent said magnetic gaps thereby providing connection to an inductance which is variable as a function of the widths of said gaps and thus also of axial distortion of said cylinder, the ends of C-shaped core being of equal area and said windings portions being equal thereby to render said inductance substantially insensitive to small angular displacements between said parts.

4. A load cell comprising:

a hollow cylinder constructed of a material providing substantially repeatable and linear elastic characteristics along the axis of the cylinder;

at each end of said cylinder, an end cap bridging the interior of said cylinder at different points along the length of the cylinder;

mounted on one of said end caps, a first magnetic core extending transversely to the cylinder axis and providing a pair of spaced faces which are essentially perpendicular to said axis;

a magnetically permeable core of generally C-shaped configuration mounted on the other of said end caps with the ends of the C-shape each being in close proximity to said faces of said first core thereby to form magnetic gaps whose widths are aligned with the cylinder axis, the respective face of said first core facing each of said C-shaped core ends being broader in all directions perpendicular to said axis than the respective facing end of said C-shaped core; and a respective winding on each of said ends of said C-shaped core closely adjacent the respective gap, the windings being equal and being connected in series thereby to provide an inductance which is variable as a function of the widths of said gaps and thus also as a function of relative displacement of said parts along said axis, the value of the inductance being relatively insensitive to bending or twisting of said cylinder.

* * * * *